(No Model.) 6 Sheets—Sheet 1.
G. E. NORRIS.
MACHINE FOR MAKING MATCH SPLINTS.

No. 397,513. Patented Feb. 12, 1889.

WITNESSES:
H. V. Scattergood.
S. B. Brewer.

INVENTOR:
GEORGE E. NORRIS,
by William N. Low,
Attorney.

(No Model.) 6 Sheets—Sheet 2.

G. E. NORRIS.
MACHINE FOR MAKING MATCH SPLINTS.

No. 397,513. Patented Feb. 12, 1889.

WITNESSES:
H. V. Scattergood.
S. B. Brewer.

INVENTOR:
GEORGE E. NORRIS,
by William H. Low,
Attorney.

(No Model.) 6 Sheets—Sheet 3.

G. E. NORRIS.
MACHINE FOR MAKING MATCH SPLINTS.

No. 397,513. Patented Feb. 12, 1889.

WITNESSES:
H. V. Scattergood.
S. B. Bruver.

INVENTOR:
George E. Norris,
by William W. Low,
Attorney.

(No Model.) 6 Sheets—Sheet 4.
G. E. NORRIS.
MACHINE FOR MAKING MATCH SPLINTS.

No. 397,513. Patented Feb. 12, 1889.

WITNESSES:
H. V. Scattergood.
S. B. Brewer.

INVENTOR:
GEORGE E. NORRIS,
by William N. Low,
Attorney.

(No Model.) 6 Sheets—Sheet 5.

G. E. NORRIS.
MACHINE FOR MAKING MATCH SPLINTS.

No. 397,513. Patented Feb. 12, 1889.

WITNESSES:
H. V. Scattergood
D. B. Brewer

INVENTOR
GEORGE E. NORRIS,
by William W. Dow,
Attorney.

N. PETERS, Photo-Lithographer, Washington, D. C.

(No Model.) 6 Sheets—Sheet 6.
G. E. NORRIS.
MACHINE FOR MAKING MATCH SPLINTS.
No. 397,513. Patented Feb. 12, 1889.

WITNESSES:
H. V. Scattergood.
S. B. Brewer.

INVENTOR:
GEORGE E. NORRIS,
by William N. Low,
Attorney.

UNITED STATES PATENT OFFICE.

GEORGE E. NORRIS, OF TROY, ASSIGNOR OF ONE-HALF TO ALONZO P. ADAMS, OF ALBANY, NEW YORK.

MACHINE FOR MAKING MATCH-SPLINTS.

SPECIFICATION forming part of Letters Patent No. 397,513, dated February 12, 1889.

Application filed April 28, 1887. Serial No. 236,448. (No model.)

*To all whom it may concern:*

Be it known that I, GEORGE E. NORRIS, of Troy, in the county of Rensselaer and State of New York, have invented new and useful Improvements in Machines for Making Match-Splints, of which the following is a specification.

This invention relates to improvements in machines for making match-splints in an approximately square form and collating the same in suitable bundles preparatory to dipping them into an igniferous compound; and the object of my invention is to provide an effective and simple machine for the purpose above named. This object I attain by the mechanism illustrated in the accompanying drawings, which are herein referred to and form part of this specification, and in which—

Figure 1:
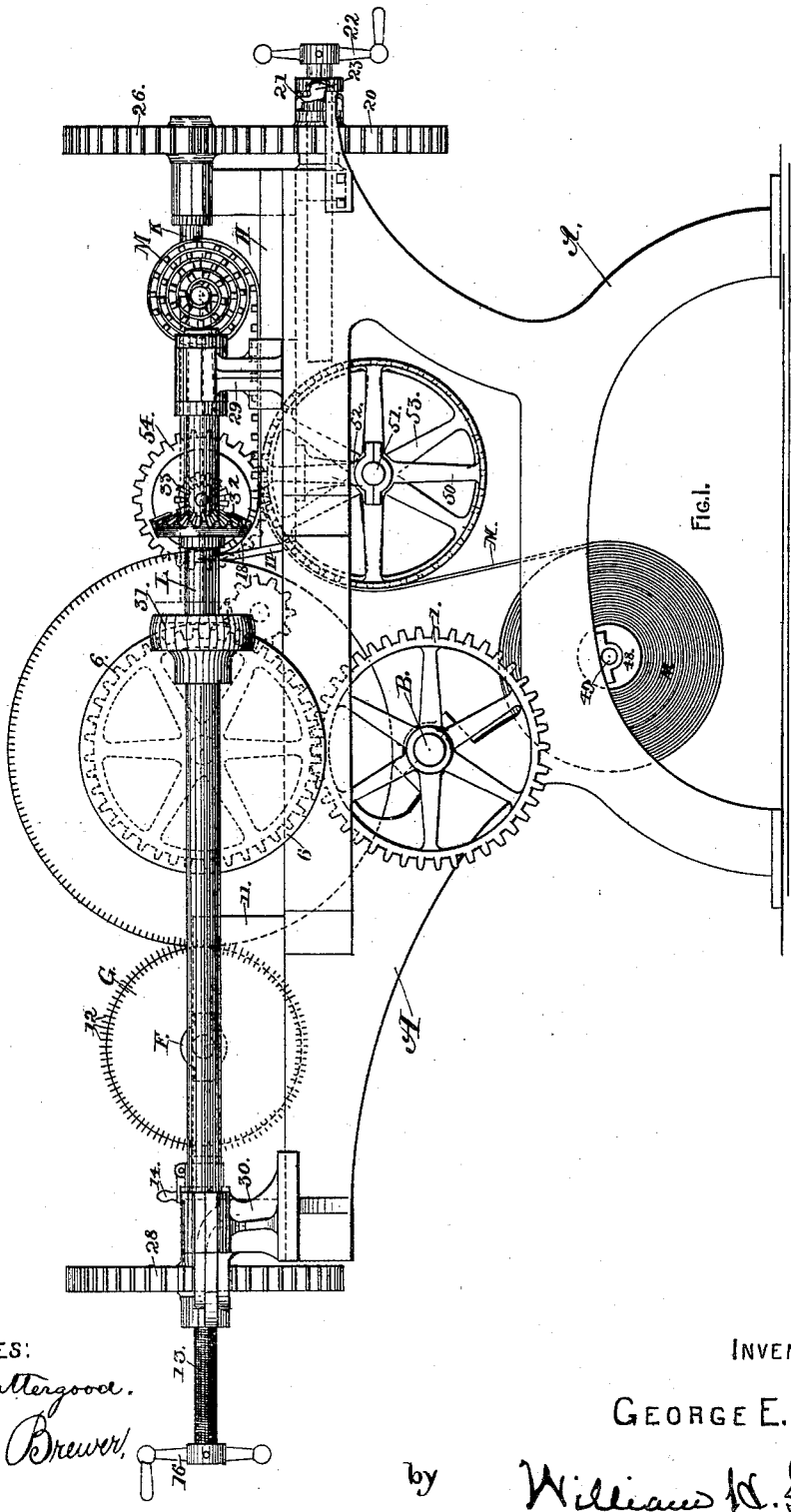
Figure 2:
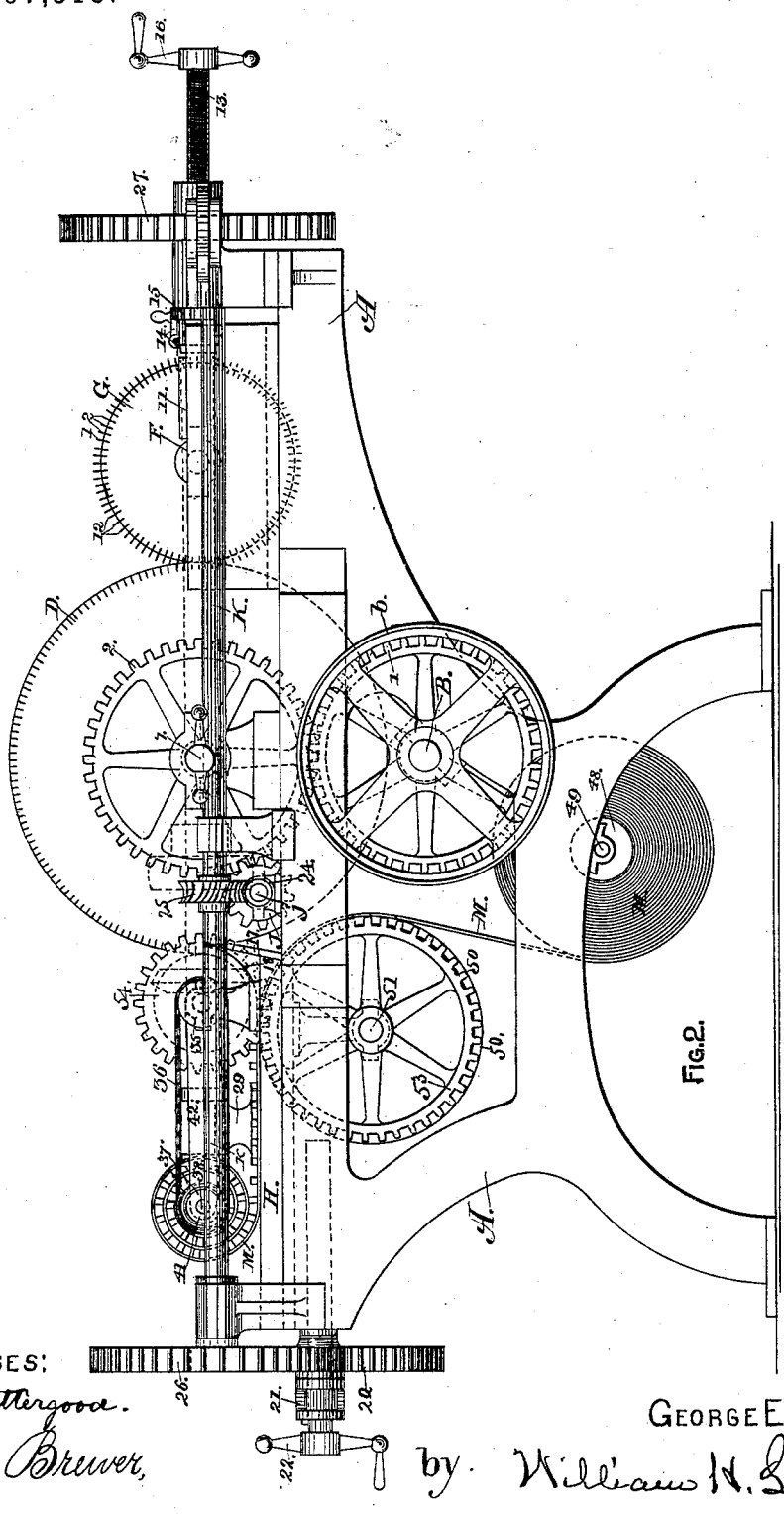
Figure 3:
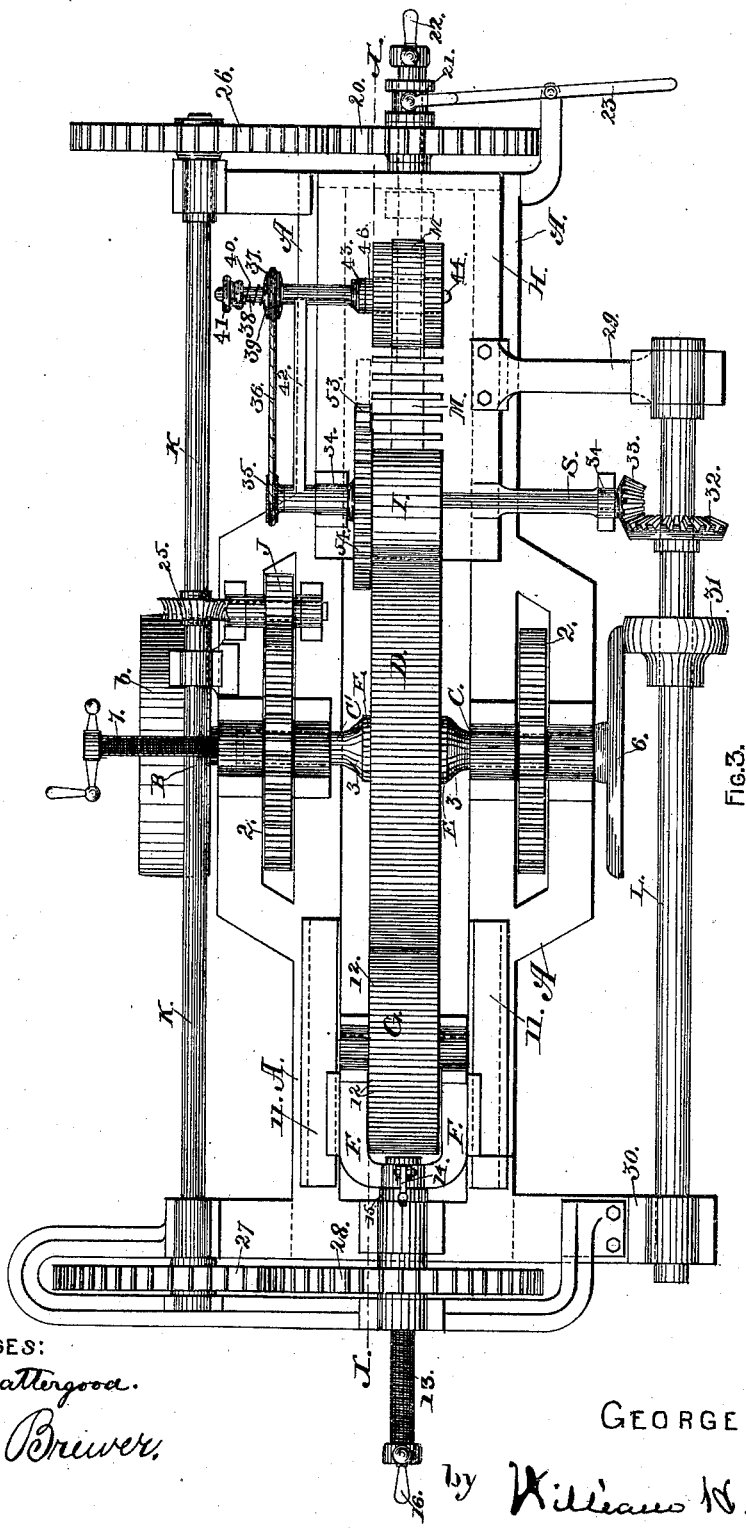
Figure 4:
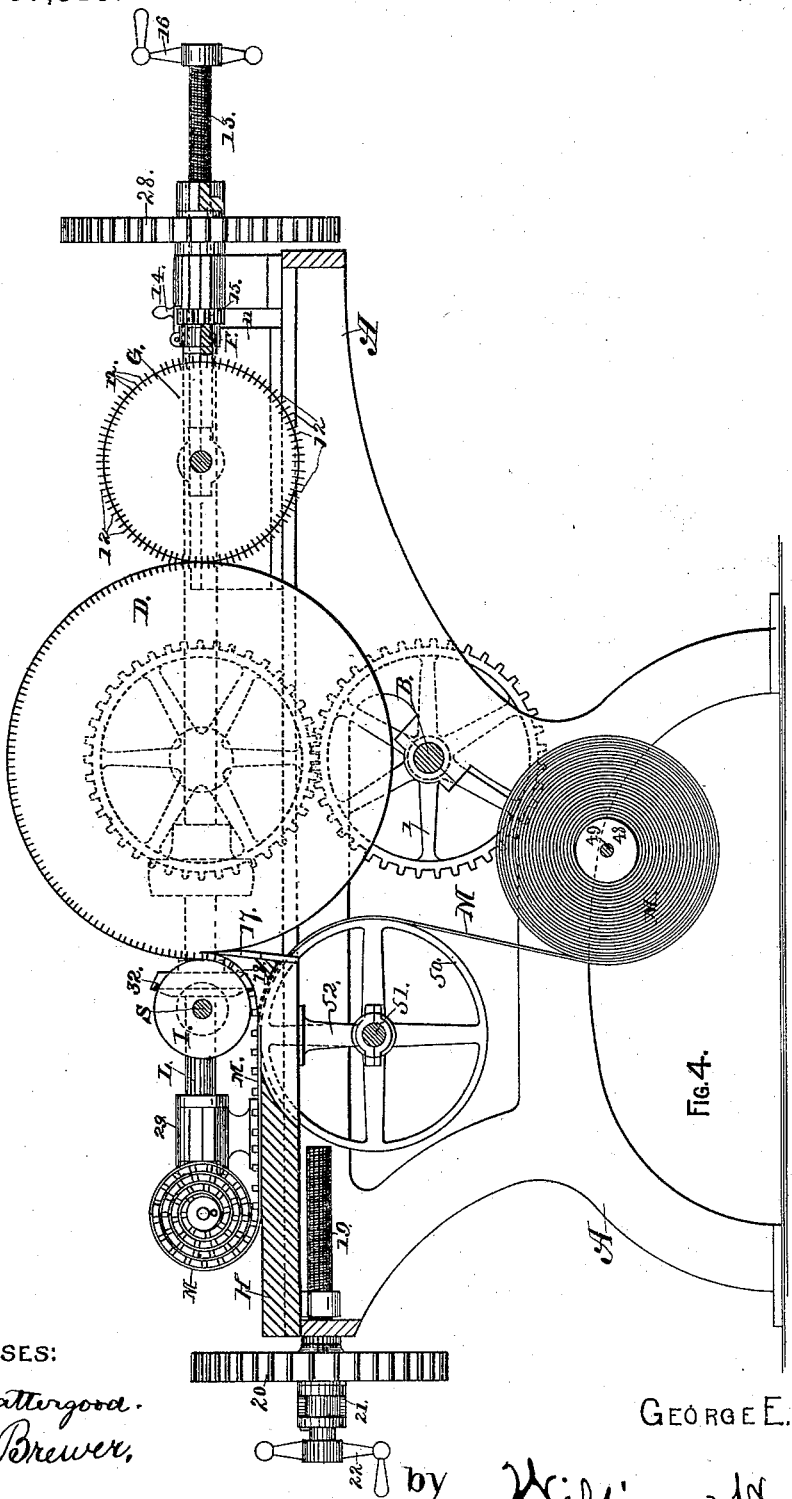
Figure 5:
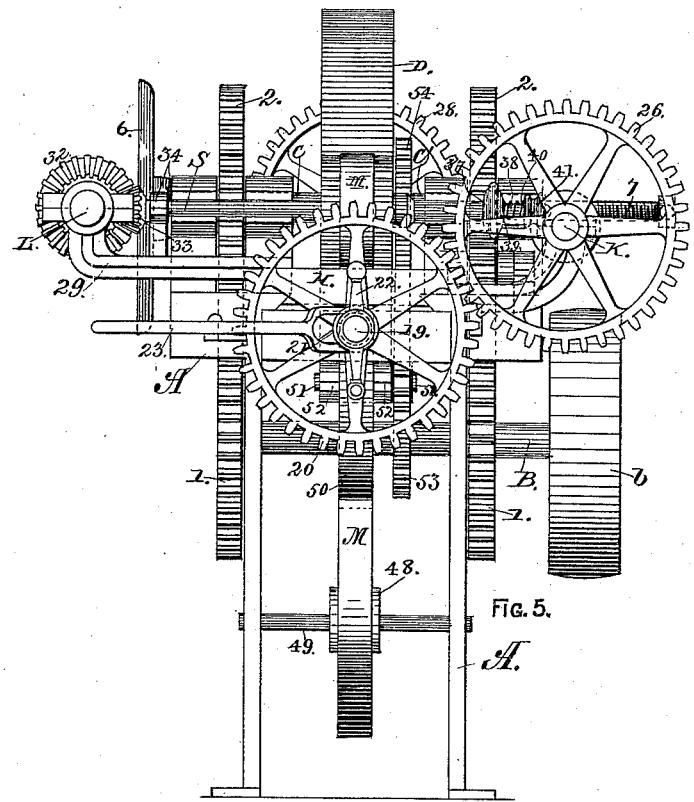
Figure 6:
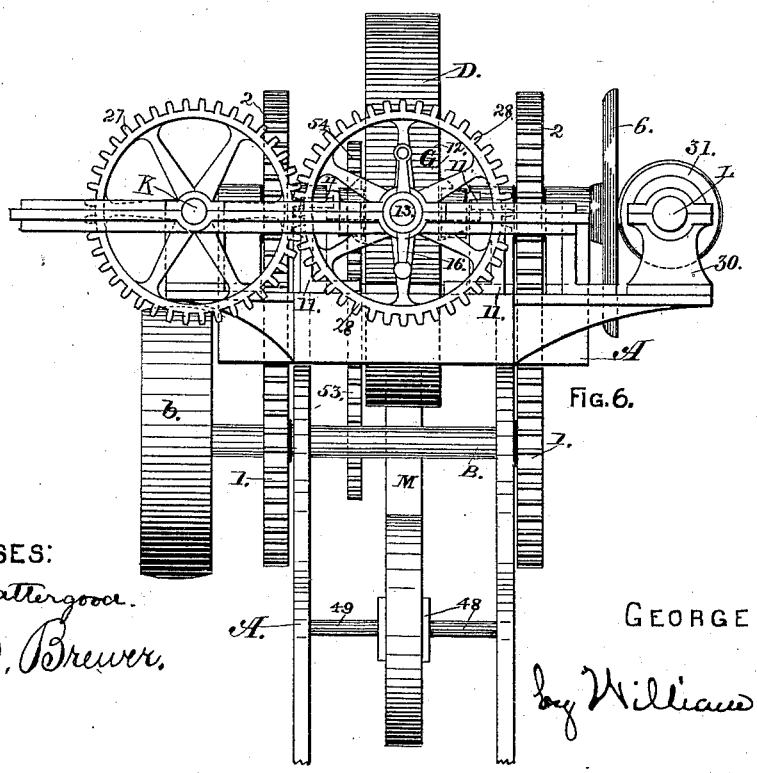
Figure 7:
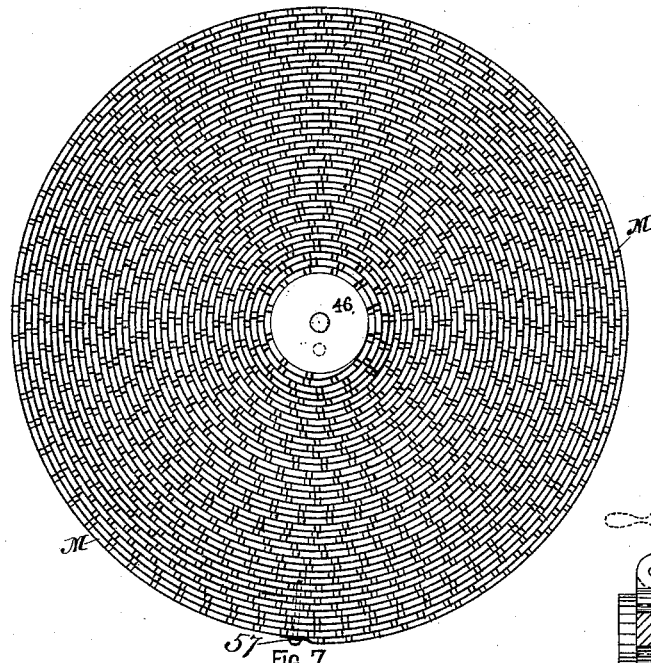
Figure 8:
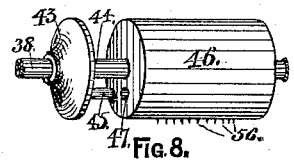
Figure 11:
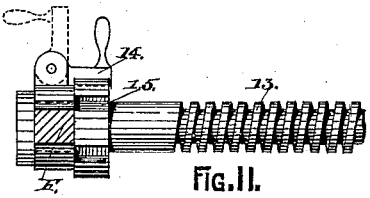
Figure 9:
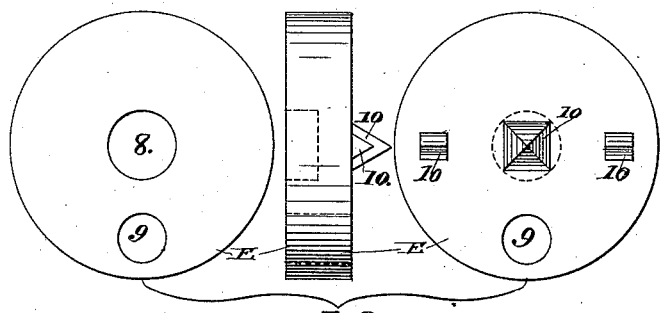
Figure 10:
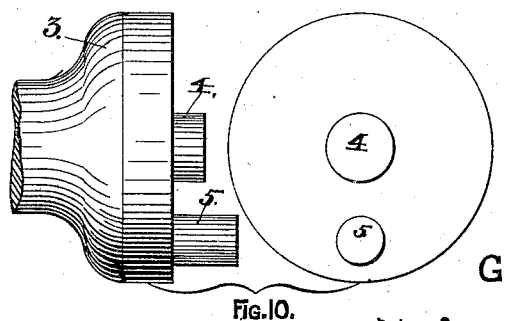

Figure 1 is a front elevation of my machine; Fig. 2, a rear elevation of the same; Fig. 3, a plan view; Fig. 4, a vertical section at the line X X of Fig. 3. Figs. 5 and 6 are end elevations showing opposite ends of my machine; Fig. 7, an enlarged side elevation of the spool of my machine, having a charge of match-splints wound thereon; Fig. 8, an enlarged perspective view of an empty spool, with its spindle and driver; Fig. 9, an enlarged front elevation, rear elevation, and side view of one of the plates for centering the blocks from which the splints are cut; Fig. 10, an enlarged side elevation and end elevation of the inner end of one of the block-driving shafts; Fig. 11, an enlarged side elevation of the disengaging mechanism for one of the feeding-screws; and Fig. 12, a plan view of the conjoined ends of the two tapes, showing the manner of connecting the same.

In the drawings, A is the frame-work of the machine, which may be made in the form shown in the drawings or in any other preferred form that is suitable for the purpose.

B is the driving-shaft, which is fitted to rotate in the frame A transversely thereto, and is provided with a pulley, b, to which power is applied from any suitable motor. Two spur gear-wheels, 1, are secured to the shaft B to engage with two similar wheels, 2, which are secured to the driving-shafts C and C'. The inner end of each of the block-driving shafts has a head, 3, formed or secured thereon, and the face of each head is provided, as shown in Fig. 10, with a centering-pin, 4, and a driving-pin, 5, the first of which is fixed centrally and the other eccentrically in said heads. The shaft C is fitted to rotate in a fixed position, and has on its outer end a flat disk, 6, for a purpose hereinafter explained. The shaft C' is fitted to slide endwise in the journal-boxes in which it revolves, and at its outer end it is provided with an adjusting-screw, 7, by which said sliding movement is effected. The shafts C and C' have their axial centers ranged in exact line with each other and are rotated at the same rate of speed.

D is a block of wood from which the match-splints are to be made. Said block is reduced to a cylindrical form before being placed in the machine. It may be of any suitable diameter, and is by preference twice the length of the matches after the latter are finished. Said block has fixed in its center at each end a centering-plate, E, which, as shown in Fig. 9, has in one of its faces a central hole, 8, into which the centering-pin 4 of the head 3 fits, and a hole, 9, in which the driving-pin 5 of said head engages. The opposite face of said centering-plate is provided with spurs 10, which are driven into the ends of the block D, so that their centering-holes 8 will range in exact coincidence with each other.

The block D, with centering-plates E fixed in its opposite ends, is placed in the machine, with centering-pins 4 and driving-pins 5 engaged in their appropriate holes in said centering-plates, and the shaft C' is adjusted endwise to bring all the parts in close contact. Then, when the driving-shaft B is set in motion, the block D will be rotated with a positive power.

F is a sliding yoke that is fitted to move on guides 11 at one end of the machine, and which carries a scoring-wheel, G, that is provided with a series of transverse scoring-knives, 12, which are spaced in the periphery of said wheel at distances to correspond to the diameter of the splints to be cut. Said scoring-knives are forced to penetrate into the periphery of the block D by a feeding-screw, 13, which must be proportioned to effect the required depth of penetration of said scoring-knives at each point of rotation of the said block, and the latter, by reason of its engagement with the scoring-knives, will impart a rotatory motion to the scoring-wheel G. The feeding-screw 13 is held normally in a fixed non-revoluble position by means of a latch, 14, hinged to the hub of the sliding yoke F, and fitted to engage in notches in a collar, 15, formed on said screw; but when occasion requires—as when setting a new block or adjusting the scoring-wheel to a block—said latch can be raised to clear it from its engagement with said collar, and the feeding-screw 13 may then be turned by hand, a hand-crank, 16, being provided for that purpose.

H is a sliding bed that is fitted to move endwise on the upper side of the frame-work A at the end opposite to that on which the scoring-wheel G is located. The inner end of said sliding bed has secured thereto a slicing-knife, 17, which is arranged lengthwise of the block D, and its cutting-edge is carried to a level with the axis of said block. Said slicing-knife is provided for the purpose of separating the splints from the periphery of the block D, the cuts for the other separations having been previously made by the scoring-knives 12. The inner end of the upper surface of the sliding bed H is curved upwardly to form the concave 18, whose upper edge is carried to or nearly to the height of the cutting-edge of the slicing-knife 17. An elastic roller, I, whose periphery is concentric to the curve of the concave 18, but at a distance therefrom that is slightly less than the diameter of the splints, (so that said roller will exert sufficient pressure on said splints to effect their separation from each other and to force them toward the level surface of the sliding bed,) is fitted to rotate in the hollow of said concave. The peripheral speed of said roller must at all times exceed the peripheral speed of the revolving block D, the preferred ratio of such speeds being about eight to one, and the effect of this difference of speeds is to produce the required separation of the splints as they are removed from the block D.

The sliding bed H derives its motion from a feeding-screw, 19, which is proportioned so that each revolution of said screw will advance said bed toward the block D a distance that will equal the diameter of a splint. A spur gear-wheel, 20, is loosely fitted on the outer part of the feeding-screw 19, and a clutch-coupling, 21, which slides on a spline in said screw, is provided for the purpose of effecting the engagement and disengagement of said screw and wheel. By drawing back said clutch-coupling out of its engagement with the wheel 20 the feeding-screw 19 can be rotated in either direction by means of a hand-crank, 22, provided for that purpose. A clutch-lever, 23, is provided for sliding the clutch-coupling into and out of gear with the wheel 20 whenever occasion may require.

J is a pinion that is secured to the shaft j and engages with the wheel 2, secured on the shaft C'. The shaft j has on its outer end a worm, 24, which engages with a worm-wheel, 25, secured on the longitudinal shaft K, so as to impart the required rotatory motion to the latter. On one end of the shaft K is secured a spur gear-wheel, 26, which engages in the wheel 20 to impart motion to the feeding-screw 19. At the opposite end of the shaft K is secured another spur gear-wheel, 27, that engages with a like wheel, 28, whose central hub forms a revoluble screw-nut for the stationary feeding-screw 13, hereinbefore described.

L is a longitudinal shaft arranged at the front side of the machine and having one end journaled in a bracket, 29, secured to the sliding bed H, and its opposite end journaled in a stationary bracket, 30, secured to the frame-work A. Said shaft has an endwise movement that is imparted thereto by the sliding bed H, and it is provided with a friction-wheel, 31, which bears in frictional contact against the face of the disk 6, that is secured to the shaft C, as hereinbefore described. By reason of the sliding movement given to the shaft L the friction-wheel 31 is caused to move constantly toward the center of the disk 6, and as a consequence the rate of speed of the shaft L will be constantly variable, being greater when the friction-wheel is near the periphery of said disk and gradually diminishing as the friction-wheel approaches the center of said disk. By this variable speed of the shaft L the speed of the winding device, hereinafter described, is varied to suit the requirements of the work allotted to it. The shaft L is also provided with a bevel gear-wheel, 32, which engages with a bevel-pinion, 33, secured to the shaft S, which carries the elastic roller I. The shaft S is journaled in boxes 34, secured to the sliding bed H, and it is so moved by the latter that the elastic roller I will be held in constant contact with the periphery of the block D regardless of the diameter of said block at any stage of the operation of cutting the splints therefrom. The inner end of the shaft S has a grooved pulley, 35, secured thereon, and said pulley is connected by a band, 36, to another grooved pulley, 37, that is loosely fitted on a spindle, 38. The pulley 37 is held in frictional contact with a fixed flange, 39, on spindle 38 by a spring, 40, which receives the pressure of a screw-nut, 41, and by the latter the pressure of said spring can be increased or diminished, as occasion may require. The spindle 38 is journaled in the free end of an arm, 42, which is pivoted at the opposite end to the shaft S. The inner end of said spindle is provided with a head, 43, which carries a center pin, 44, and a driving-pin, 45. The spool 46 is provided with a central hole, which fits the center pin, 44, and a hole, 47, in which the driving-pin 45 engages to impart the rotatory motion of the spindle 38 to said spool. By this arrangement the spools are rendered readily attachable and detachable to and from the spindle 38.

M is a single tape or web, which is wound on a reel or hub, 48, that is loosely fitted to revolve on a spindle, 49, wherefrom said reel can be readily removed when its tape is exhausted, and another reel with a fresh supply of tape substituted therefor. Said tape, in passing from said reel, is first carried over a guide-pulley, 50, secured to a shaft, 51, journaled in hangers 52, secured to the under side of the sliding bed H. From said guide-pulley the tape M is carried through a slotted opening in the sliding bed H. On the upper side of the latter said slotted opening finishes at the base of the concave 18, and at that point the splints, after being separated from the block D, are delivered upon the upper face of said tape.

The tape M must be of sufficient thickness to prevent the heads of the different layers of matches when finished from coming in contact with each other, and the outer end of said tape is attached to the spool 46 by being caught on radial pins 56, fixed in said spool. By the rotations of the spool 46 the tape M and its imposed charge of splints is drawn toward and wound around said spool. Each turn of said tape binds a layer of splints between itself and the next turn thereof, and the final end of said tape is fastened by means of an ordinary dress-pin, 57, which is inserted to pass through several turns of the tape; but when preferred any other mode of fastening the coil of tape may be substituted for said pin. It will readily be seen that by this mode of operation a single tape is sufficient to secure a large number of splints in a single bundle ready for dipping them into an igniferous preparation to complete the operation of converting the splints into merchantable matches. On the outer end of the shaft 51 a spur gear-wheel, 53, is secured to engage with a pinion, 54, on the shaft S for the purpose of imparting motion to the guide-pulley 50.

Figure 12:
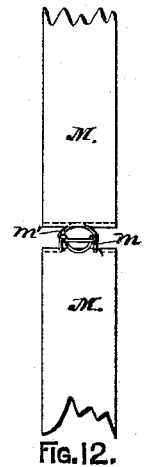

To facilitate the introduction of successive lengths of the tape M into the machine, each length of said tape has a hook, $m$, secured to one end, and an eye, $m'$, at the opposite end for the purpose of connecting the successive lengths together, as shown in Fig. 12, until the incoming end of a length of said tape has been drawn through the slotted opening of the sliding bed H far enough to permit of their separation, which last-named operation can be speedily effected without interrupting the operation of the machine.

I am aware that tapes have heretofore been used in match-machines for conveying the splints into and out of a tank of igniferous compound, as in the machine shown in Letters Patent No. 337,074, March 2, 1886, of which I am one of the inventors; but in all prior machines two separate webs of tape have been employed, one being placed on top of the other, and the matches have been fed between the two layers of the tape.

I claim as my invention—

1. In a machine for making match-splints from a revolving block, the combination of a scoring-wheel provided with a series of scoring-knives, and a slicing-knife secured to a sliding bed which carries a tape-winding mechanism, the said scoring-wheel being disconnected from the slicing-knife and each being provided with an independent feeding mechanism, whereby they can be fed at a uniform rate of speed toward each other, each of said feeding mechanisms being provided with a disengaging device, whereby the feeding movement of either or both can be suspended and resumed, and both having hand-operating appliances by which they can be manipulated during disengagement, as and for the purpose herein specified.

2. In a machine for making match-splints, the combination of a scoring-wheel provided with a series of scoring-knives and fitted to rotate in a carrier moving on guides and a feeding-screw for imparting a positive feeding movement to said carrier, said feeding-screw having a disconnecting attachment, whereby said feeding movement can be suspended and resumed, and also having a hand-operating attachment, whereby said feeding-screw can be manipulated during its disengagement, as and for the purpose herein specified.

3. In a machine for making match-splints, the combination of a scoring-wheel provided with a series of scoring-knives for scoring a revolving block, a slicing-knife for removing the splints from said block, a concave bed directly behind said slicing-knife, and an elastic roller which bears against the splints as they are removed from said block and by which said splints are separated from each other, substantially as and for the purpose herein specified.

4. In a machine for making match-splints from a revolving block, the combination of a scoring-wheel provided with a series of scoring-knives actuated to score a revolving block across its periphery, a slicing-knife for removing the splints from said block, a concave bed directly behind said slicing-knife, an elastic roller arranged to rotate in said concave bed at a greater peripheral speed than the revolving block, and a single tape or web moving directly under said elastic roller, substantially as and for the purpose herein specified.

5. In a machine for making match-splints from a revolving block, the combination of a splint-cutting mechanism, a block-revolving shaft provided with a friction-disk, a sliding shaft provided with a friction-wheel whose periphery bears upon the flat face of said friction-disk to produce a variable speed for the sliding shaft, a transverse shaft geared to said sliding shaft, a single tape or web, and a tape-spool spindle actuated by said transverse shaft and having a variable rate of speed that corresponds to the peripheral speed of the constantly-increasing bundle of splints that is formed on the spool attached to said spindle, substantially as and for the purpose herein specified.

6. In a machine for making match-splints from a revolving block, the combination, with a block-revolving mechanism, a scoring-wheel provided with a series of scoring-knives, a slicing-knife oppositely located to said scoring-wheel, said slicing-knife and scoring-wheel being fed toward each other at the same rate of movement, a concave bed directly behind said slicing-knife, and an elastic roller revolving in the hollow of said concave bed, of a longitudinal shaft having a transverse shaft geared thereto, a single tape or web, and a tape-spool spindle, said shafts and spindle being rotated at a speed that is variable in respect to time, but uniform in respect to each other, substantially as and for the purpose specified.

7. In a machine for making match-splints, the combination of a splint-cutting mechanism, a concave bed directly behind said cutting mechanism, an elastic roller rotating in said concave bed, a single flat tape or web which moves directly under said elastic roller, and a tape-winding mechanism, the splints being passed directly between the periphery of said elastic roller and the face of the tape and being retained on said tape-winding mechanism by their involvement between the successive convolutions of said tape, as and for the purpose herein specified.

GEORGE E. NORRIS.

Witnesses:
ALONZO P. ADAMS
WM. H. LOW.